July 4, 1950
P. PRELL
2,513,673
PICTURE FILM PROJECTING MACHINE
AND SOUND PRODUCING MEANS
Filed July 1, 1947
6 Sheets-Sheet 1
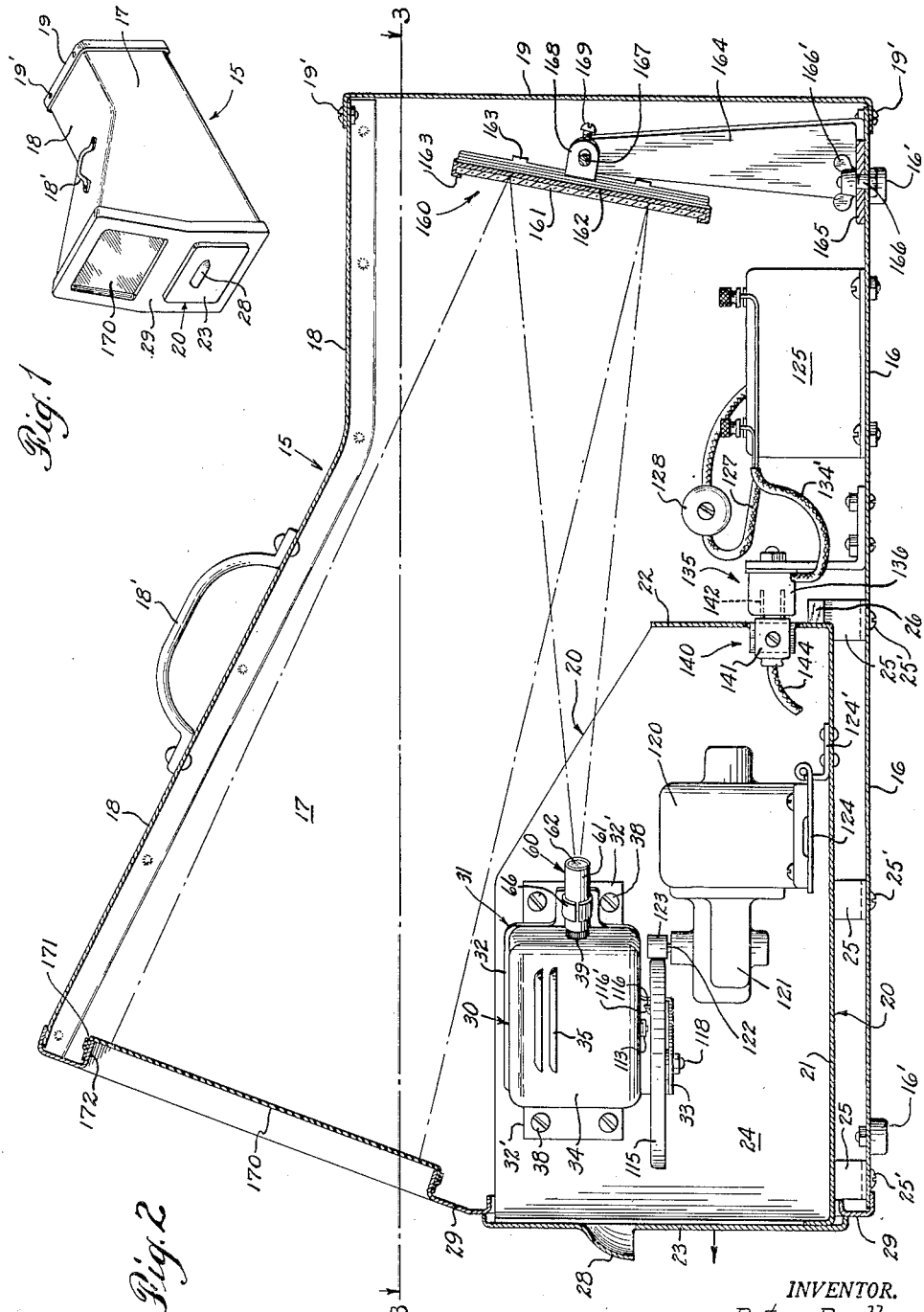
INVENTOR.
Peter Prell
BY
Austin, Wilhelm & Carlson
ATTORNEYS July 4, 1950
P. PRELL
2,513,673
PICTURE FILM PROJECTING MACHINE
AND SOUND PRODUCING MEANS
Filed July 1, 1947
6 Sheets-Sheet 2
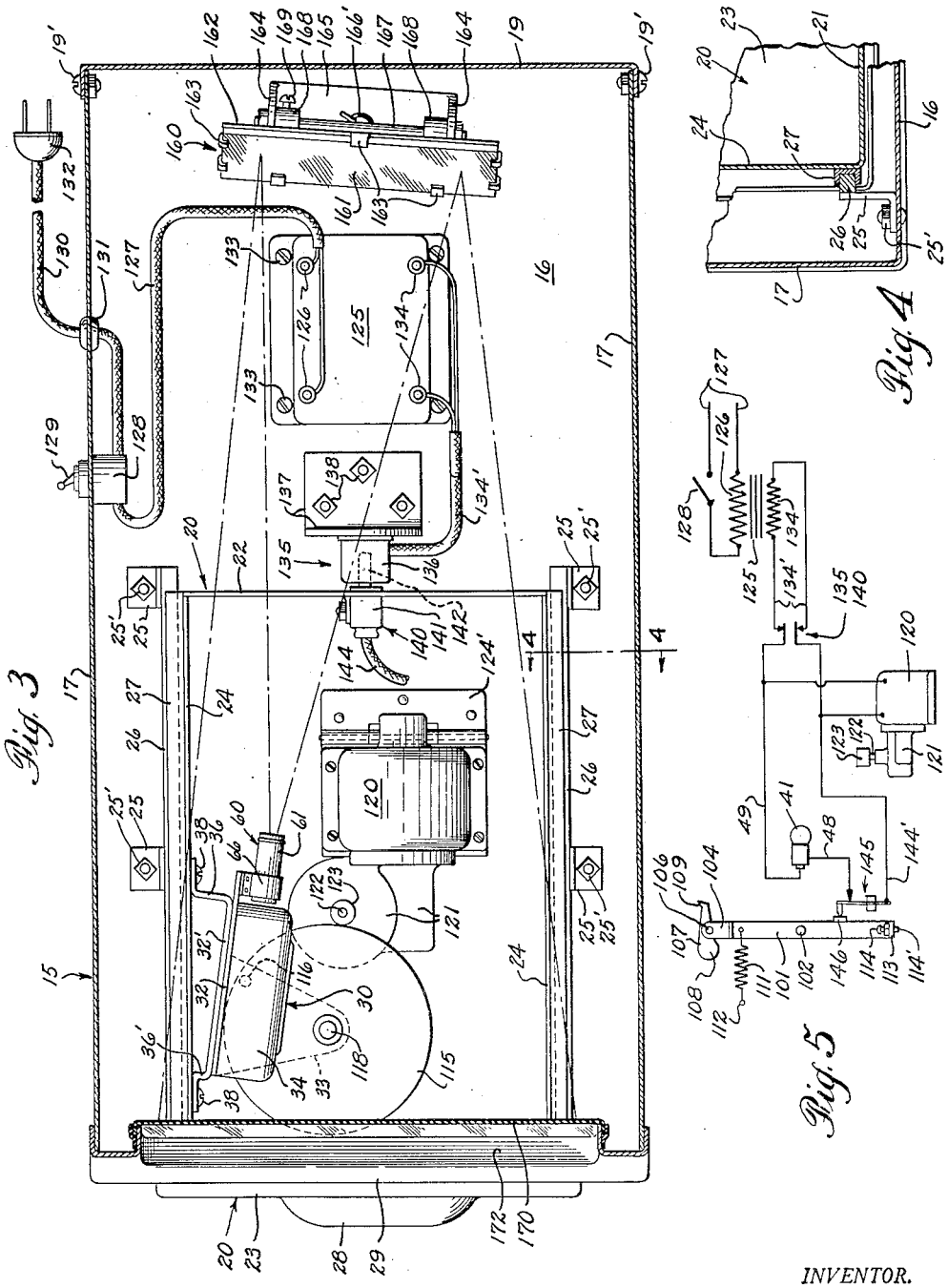
INVENTOR.
Peter Prell
BY
Austin, Wilhelm & Carlson
ATTORNEYS

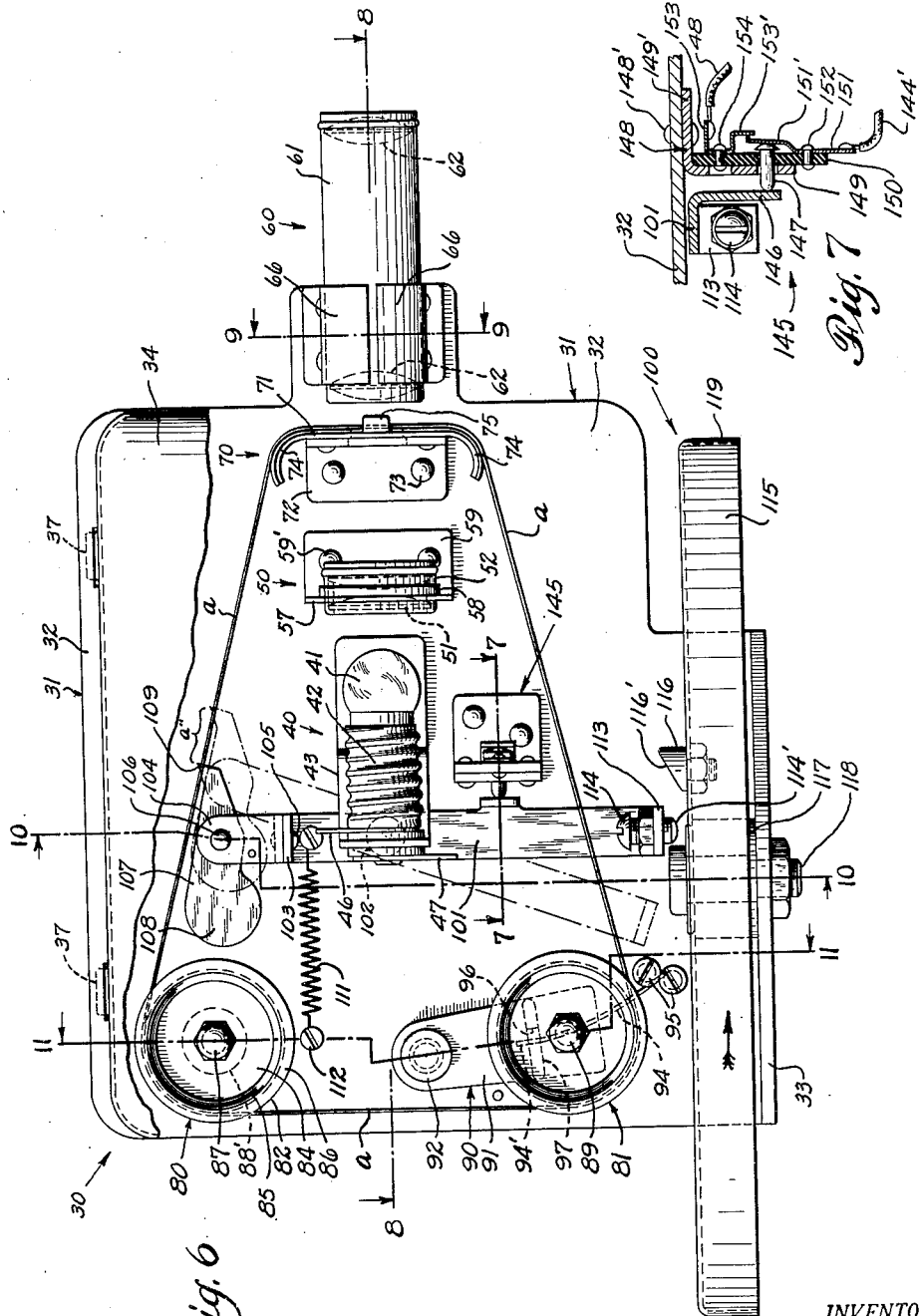

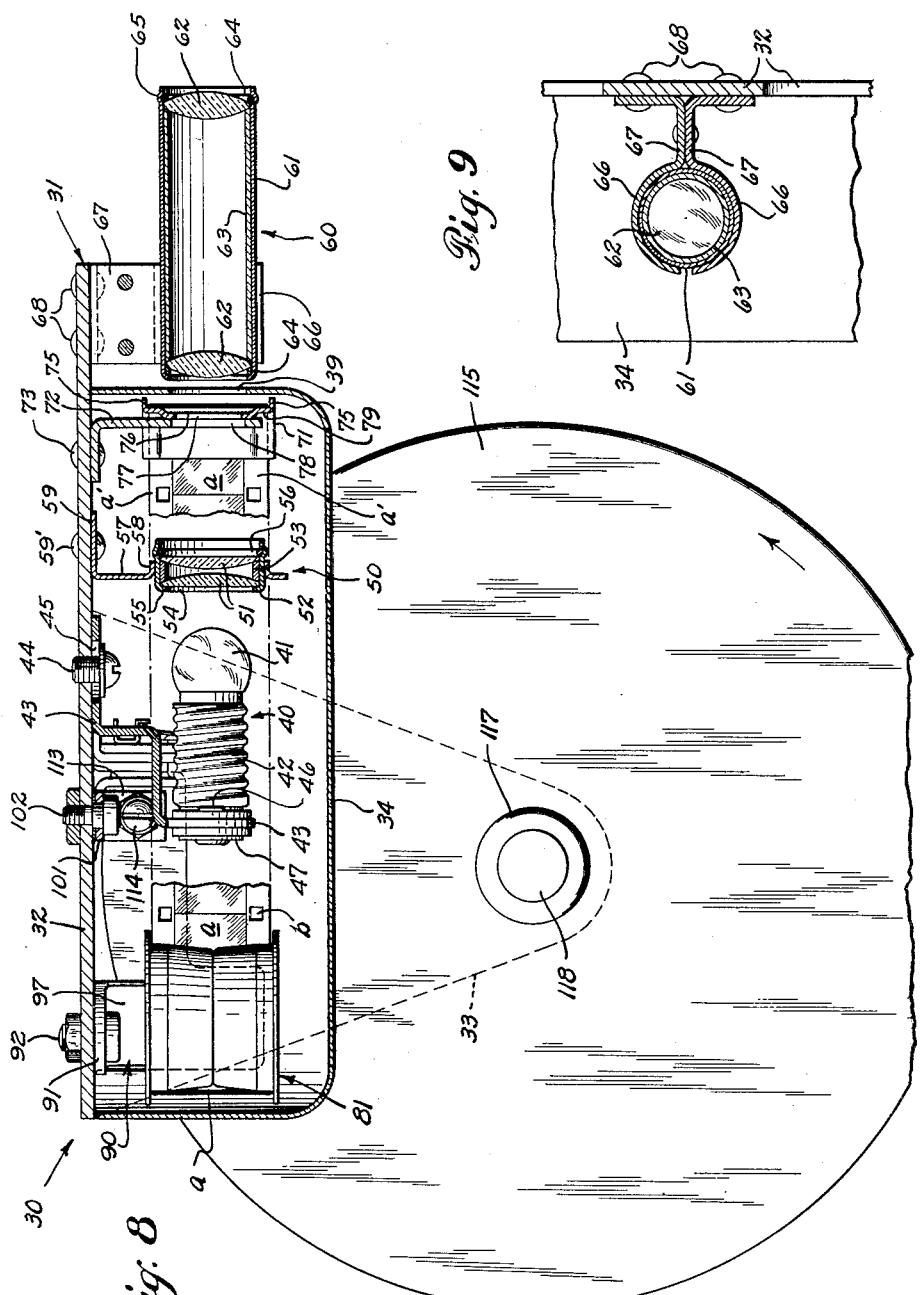

July 4, 1950

P. PRELL 2,513,673

PICTURE FILM PROJECTING MACHINE AND SOUND PRODUCING MEANS

Filed July 1, 1947

INVENTOR.
Peter Prell

BY
Austin, Wilhelm & Carlson
ATTORNEYS.

INVENTOR
Peter Prell
BY
Austin, Wilhelm + Carlson
ATTORNEYS

Patented July 4, 1950

2,513,673

UNITED STATES PATENT OFFICE 2,513,673

PICTURE FILM PROJECTING MACHINE AND SOUND-PRODUCING MEANS

Peter Prell, New York, N. Y.

Application July 1, 1947, Serial No. 758,425

13 Claims. (Cl. 88—28)

This invention relates to an improved picture projecting machine, and more particularly to an improved machine presenting in a compact unit a viewing screen in combination with picture projecting mechanism operative to project successive scenes or views from a picture film, with or without an accompanying sound record.

This invention is directed to the provision of an improved machine for successively projecting views from a picture film or strip onto a translucent viewing screen, compactly arranged as a single unit housed within an enclosed casing. This improved machine is characterized by a translucent viewing screen mounted in a wall panel of the enclosing casing upon which the successive views of the picture film may be projected and clearly viewed. The light source, condensing lenses and objective tube are compactly arranged and assembled in combination with film supporting and advancing devices to provide a compact mechanism supported upon a carrier which may be moved into and out of the machine casing for the convenient application and removal of the picture film.

As a further feature, one or more reflecting mirrors are adjustably mounted within the relatively small casing in a manner to reflect the picture rays produced by the projector unit from the exceedingly small pictures of sixteen millimeters or less, onto the viewing screen in greatly enlarged and clearly visible size.

Mechanism is provided for instantly advancing the successive picture frames at predetermined time intervals, and for de-energizing the light source during the instant the film is advanced in a manner to avoid objectionable light flicker on the viewing screen. The film advancing mechanism is preferably driven by a small electric motor supported upon the movable projector carrier. As a further feature, an electrical contact fixed within the casing is arranged to cooperate with an electrical contact associated with the movable carrier whereby the power source to the electric motor and projector lamp is automatically connected when the carrier is fully inserted in the casing, and disconnected when the carrier is withdrawn from the casing.

A further feature of this invention is the use of a low voltage projector lamp and a low voltage operating motor so as to render unnecessary the use of special insulating means to protect the picture film from the heat generated by the projector lamp. This desirable result is effected by connecting the power line of standard commercial voltage to the high voltage side of a transformer contained in the casing, the low voltage side of the transformer supplying power to the low voltage motor and low voltage electric lamp forming part of the projector.

Sound producing means, such as a record player, may be adaptably incorporated as a part of this improved picture projecting machine. The record player may embody either a mechanical or an electrical sound producing system, and may be mounted on the movable carriage which supports the projector to facilitate removal and attachment of the sound record. The driving motor which operates the picture film advancing mechanism is also utilized to drive the record player.

This improved machine is adaptably designed to project pictures from an endless picture film or strip, or may be equipped with pay-out and take-up reels operative to feed a picture strip of any desired length through the film projector. The desirable attributes of expensive picture projecting machines for projecting successive still or moving pictures on screens spaced separate and apart from the projector and requiring the attention of skilled operators, are incorporated in this relatively simple machine which can be manufactured at modest cost and successfully operated by unskilled operators. All the mechanisms and accoutrements for complete picture reproduction are condensed in this unit and adapted to be compactly contained in a portable casing. The film and the sound record can be easily and conveniently removed and replaced upon withdrawal of the movable carrier from the casing.

Since the electrical connections to the projector and driving motor are automatically disconnected when the supporting carrier is moved out of the casing, this machine can be operated with assured safety by children and unskilled operators. Since the electric lamp as well as the driving motor is operated by low voltage current, these devices which are a constant source of failure, possess long and durable life, the power supply to the machine being nevertheless of commercial voltage. The light reflecting system, incorporating the use of one or more reflecting mirrors, permits the projection of a clearly viewable picture of substantial size on the viewing screen, even though a very small millimeter film is used. The component parts of this machine are simple in design and construction, making possible the low cost mass production of these machines substantially below the cost of other picture projecting machines now available.

This improved machine may be used to operate films presenting pictures of both entertaining and educational value. When a sound reproducer is incorporated therewith, records having appropriate explanatory talks or music may be run in synchronism with the projected pictures from the film. The machine is simple and substantially fool-proof in operation and is therefore particularly adapted to be operated by children for their entertainment and educational benefit. Machines may be constructed in accordance with this invention of appropriate size or capacity for use as an advertising device and wherein the sound record may carry suitable descriptive sales talk coordinated with picture views showing commercial products, or to provide promotional and educational information relating to the construction, make-up or manufacturing procedures employed in the production of advertised commercial products.

Further objects and advantages of this invention will become apparent as the disclosure proceeds.

Although the characteristic features of the invention will be particularly pointed out in the claims appended hereto, the invention itself, and the manner in which it may be carried out, may be better understood by referring to the following description taken in connection with the accompanying drawings forming a part hereof, in which:

Fig. 1 shows this improved picture projecting machine in perspective and as it may be constructed to appear in exterior view.

Fig. 2 is an enlarged vertical cross-sectional view taken longitudinally of the machine illustrating certain structural details of the outer casing and the operating mechanism contained therein.

Fig. 3 is a horizontal cross-sectional view through the outer casing additionally showing the arrangement of the mechanism housed therein as viewed in the direction of the arrows 3—3 of Fig. 2.

Fig. 4 is a fragmentary vertical cross-sectional view of a fragmentary detail of the outer casing and sliding tray and the track mounting therefor, as the same would appear when viewed along line 4—4 of Fig. 3.

Fig. 5 is a schematic wiring diagram illustrating certain electrical circuits embodied in the machine.

Fig. 6 is a side elevational view of the projector instrument forming a part of the machine, certain parts being broken away to illustrate structural details.

Fig. 7 is a sectional detail of the light control switch in cooperating relation to the picture strip actuator as the same would appear when viewed along line 7—7 of Fig. 6.

Fig. 8 is a horizontal cross-sectional view of the projector instrument and a top plan view of the rotatable table which manipulates the film actuator as the same would appear when viewed along line 8—8 of Fig. 6.

Fig. 9 is a transverse cross-sectional detail of the projector instrument illustrating more particularly the objective tube thereof as the same would appear when viewed along line 9—9 of Fig. 6.

Figure 12:
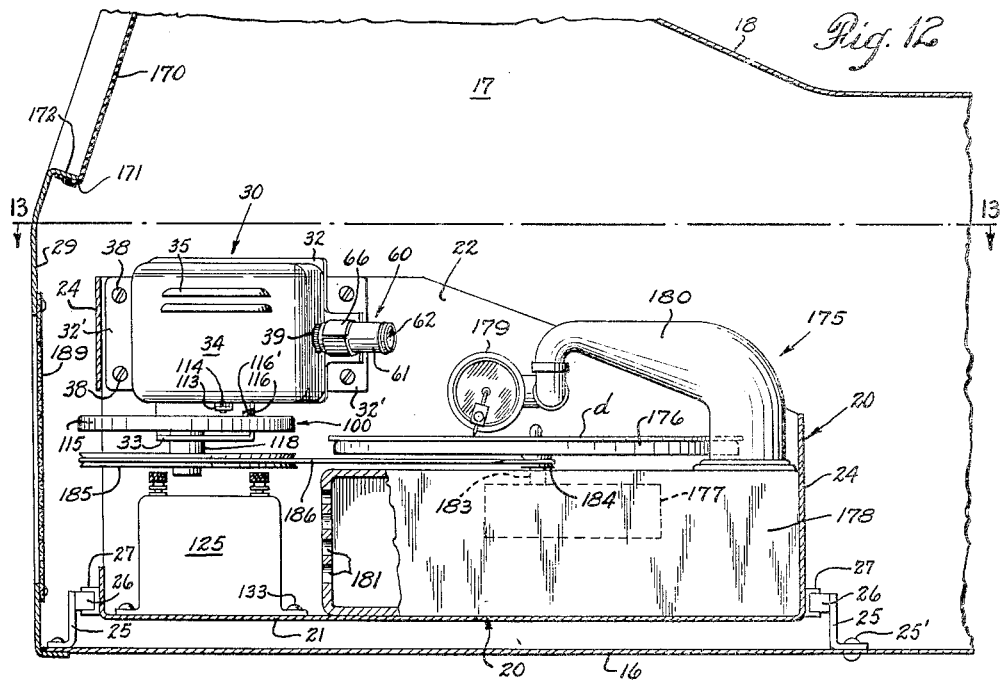
Figure 13:
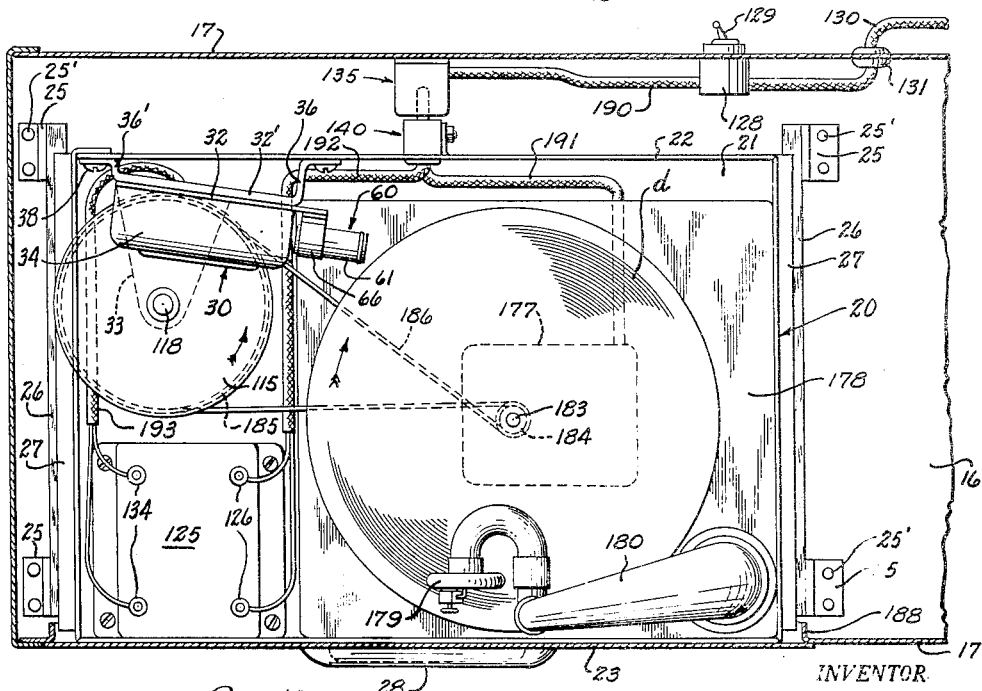

Fig. 12 is a fragmentary vertical cross-sectional view of the machine casing showing as a modification, an elevational view of a typical sound reproducing instrument in driving association with the view strip actuator of the projector instrument; and Fig. 13 is a horizontal cross-sectional view of a fragmentary part of the machine casing showing further details of the sound reproducing instrument in association with the projector instrument as the same would appear when viewed along line 13—13 of Fig. 12.

Similar reference characters refer to similar parts throughout the several views of the drawings and specification.

This improved picture projecting machine, as typically illustrated in the drawings, generally comprises an enclosed substantially light-proof housing or casing 15 in which the machine instruments and operating mechanisms, are contained. This improved machine incorporates a projector instrument 30 through which the picture film a is advanced. As shown more particularly in Figs. 6, 8, 10 and 11, the projector instrument 30 embodies a light producing assembly 40, a condensing lens assembly 50 in association with an objective tube assembly 60, and a film guide assembly 70 positioned between condensing lens assembly 50 and the objective tube assembly 60.

Film actuating mechanism 100 associated with the projector instrument is provided for advancing the picture film a through the film guide assembly 70, the film actuating assembly 100 being driven by a motor 120 through appropriate transmission mechanism. Driving power for the electric motor 120 is provided by a step-down transformer assembly 125 through a fixed contact assembly 135 in detachable association with a companion plug-in assembly 140.

The picture rays from the projector instrument 30 are initially thrown onto a reflecting mirror assembly 160 which is positioned at one end of the containing casing 15 opposite the end at which the projector instrument 30 is positioned. The picture rays reflected by the mirror assembly 160 are thrown upon a translucent viewing screen 170 mounted on a wall panel of the containing casing 15 in a position to be clearly viewable from the exterior thereof. The machine may incorporate one or more reflecting mirror assemblies 160 provided to effect substantial enlargement of the picture scenes as placed upon the viewing screen 170, the reflecting mirror system being such as to permit a compact arrangement of the various instruments and mechanisms within a containing casing 15 of limited overall size.

To facilitate and otherwise greatly simplify the removal and replacement of the picture film or strip a in and from the projector instrument 30, the projector instrument 30, the film actuating motor 120 and associated power transmission mechanism is mounted upon a movable carrier or tray 20 which can be partially or wholly withdrawn through one of the walls of the containing casing. Any desired adjustments of the various operating parts of the projector instrument 30, as well as removal and replacement of the picture film, may be easily, quickly and accessibly made by the simple expedient of partial or complete withdrawal of the movable carrier from its place of residence within the containing casing. Upon such withdrawal, the power supply to the motor 120 is automatically cut off at the power contact connections 135 and 140, the contact connection 140 being associated with the movable carrier 20 while the contact connection 135 is secured in fixed position within the casing 15. When the movable carrier 20 has been fully inserted within the containing casing, electrical connection between the power contact elements 140 and 135 is automatically effected.

This improved machine is designed to be operated from available house current, precautionary means being taken by the use of a stepdown transformer 125 to substantially reduce the current voltage supplied to the light producing assembly 40 to a low and safe voltage of approximately six volts. This low voltage is sufficient to operate the light producing assembly in a manner to produce ample light to effect the reproduction of clear and distinct pictures on the viewing screen 170, with the further advantage of a long and lasting life of the light producing assembly 40 and other parts of the machine. The danger of electric shock to the hands of unskilled operators of the machine is also greatly minimized and obviated.

Sound producing mechanism 175, as shown more particularly in Figs. 12 and 13, may be adaptably incorporated as part of the machine. The sound producing means may comprise either a mechanical or electrical sound producing system and is desirably mounted upon the movable carrier 20 so that the sound producing instrument may be readily withdrawn from the container casing 15 to facilitate and make easy the removal and replacement of selected sound tracks or records. In this assembly the same motor may be used to drive the record player and the film actuating mechanism associated with the projector instrument. The step-down transformer 125 would also be mounted on the movable carrier, the detachable power connecting assemblies 135 and 140 being nevertheless employed so that the power connection may be broken on withdrawal of the removable carrier from, and connected upon insertion of the movable carrier within, the containing casing.

The structural details of this machine, including the instrumentation and operating mechanisms associated therewith, may be variously constructed and designed within the purview of this invention. Typical details of the construction which may be employed are illustrated in the drawings and will now be described in further detail.

The containing casing

The containing casing 15 in which the various instruments and mechanisms are housed, may be variously shaped and formed in metal, plastics or wood to provide a durable and attractive casing. A typical form of casing which may be employed, as illustrated in the drawings, may present a bottom wall 16, side walls 17, a top wall 18 and a rear wall 19, these walls being so named to facilitate description only.

The movable carrier 20 may be formed as a drawer or tray presenting a bottom wall 21, a rear wall 22, a front wall panel 23, and suitable side walls 24. The carrier or tray 20 may be slidably supported on suitable spaced angle brackets 25 which extend along the side walls 24 of the tray, as shown more particularly in Figs. 2, 3 and 4. The brackets 25 may be secured to the bottom wall 16 of the outer casing as by suitable securing elements 25'. The supporting brackets 25 are arranged in paired rows, each row of brackets supporting a guide bar 26 designed to slide within a channel-shaped member 27 fixed to the adjacent side wall 24 of the tray carrier 20. The front wall panel 23 of the tray carrier 20 may be provided with a suitable manipulating handle 28 by which the tray carrier may be withdrawn from and inserted into the outer casing 15.

The adjacent wall of the outer casing may be provided with framing 29 of attractive contour which defines therein a conforming opening through which the tray 20 may be received. The rear wall 19 may be detachably secured to the casing structure by means of detachable securing elements 19' so that the rear wall 19 of the casing may be made removable to provide for adequate access to certain of the instruments and mechanisms contained within the casing and to facilitate adjustment and repair thereof. The top wall 18 of the casing may be provided with a suitable carrying handle 18', and the bottom wall 16 of the casing may be provided with suitable cushion mounts 16', formed of insulating rubber or the like, whereby the machine may be supported and spaced in non-marring and insulated relation to a supporting table or other piece of furniture as desired.

The projector instrument

The projector instrument 30, contained within the movable carrier 20, may be suitably supported on one of the side walls 24 of the carrier 20, as more particularly illustrated in Figs. 2, 3, 8, 9 and 10. As shown in these figures, the mount for the projector instrument may comprise a relatively sturdy angle shaped bracket 31 having a vertical leg 32 upon which the light producing assembly 40, the condensing lens assembly 50, the film guide assembly 70 and the objective tube assembly 60 may be suitably secured and supported. The horizontal leg 33 of the bracket 31 extends inwardly of the tray carrier 20 and supports part of the transmission mechanism whereby power from the driving motor 120 is transmitted to the film actuating mechanism 100.

The light producing assembly 40, the condenser lens assembly 50, the film guide assembly 70, the film actuating mechanism 100, and the film a itself, is housed and contained within an enclosing cover 34 suitably detachably secured as by spring clip elements 37 to the vertical leg 32 of the angle shaped frame bracket 31. The enclosing cover 34 may be made of metal of attractive outline, and may be provided with louvers 35 stamped in the side wall thereof for the dissemination of any heat which may be generated by the light producing assembly 40 contained therein. The vertical leg 32 of the bracket 31 may be provided with a mounting bracket 32' as means for attaching it to tray 20 and secured on leg 32 by spot welding or other means. Flanges 36 and 36' arranged along the vertical edges of mounting bracket 32' may be suitably bent to adapt them for being attached to side wall 24 of tray 20 as by securing elements 38. The flange portions 36 and 36' of the bracket 32' may vary in length, as shown more particularly in Fig. 3, so as to support the instruments and mechanisms contained in the housing cover 34 at an angle with respect to the longitudinal center line of the machine.

Figure 10:
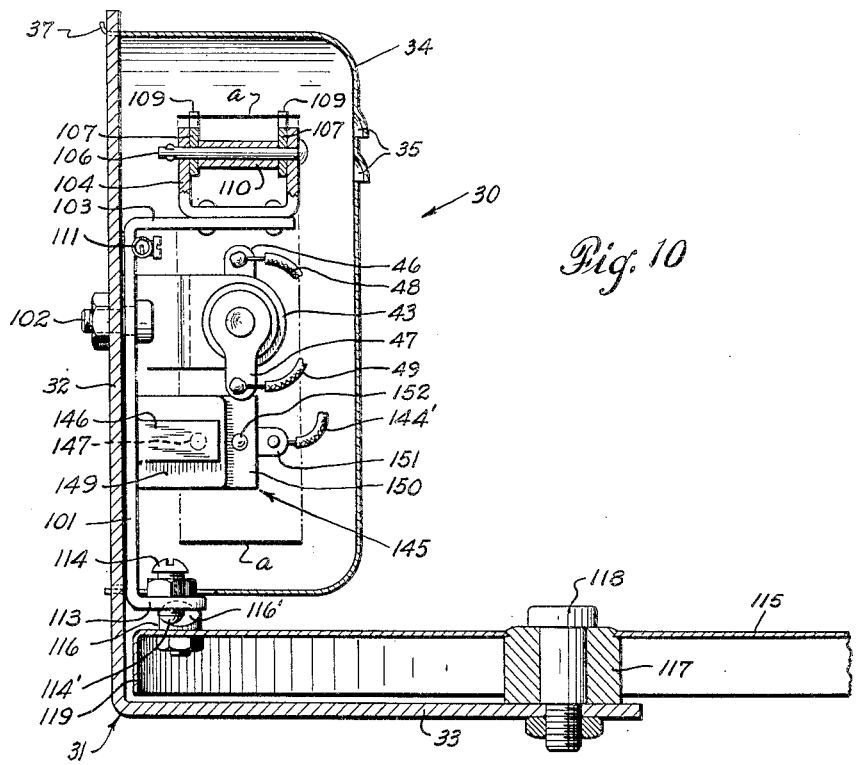
Fig. 10 is a transverse cross-sectional view taken vertically through the projector instrument as the same would appear when viewed in the direction of the arrow 10—10 of Fig. 6.

The light producing assembly 40 may comprise an electric lamp 41 threaded into a receiving socket 42 which is supported by an angular bracket 43, as shown more particularly in Figs. 8 and 10. Bracket 43 is mounted on the vertical leg 32 of the frame bracket 31 by means of a threaded stud 44 which extends through an elongated slot 45 in the bracket 43 to permit mounting adjustment of the bracket and its associated electric lamp 41. The base of the lamp socket 42 is provided with electric terminals 46 and 47 to which the electric lead wires 48 and 49 are respectively attached.

The condensing lens assembly 50 comprises a pair of light condensing lenses 51 mounted in a cup shaped housing 52 as shown in Figs. 6 and 8. The paired lenses 51 are retained in spaced relation by a spacing ring 53. The cup shaped housing 52 has a light admission opening 54 in the bottom wall thereof, the adjacent lens 51 seating against an inwardly extending rim 55 formed as a part of the bottom wall of the cup 52. The paired lenses 51 are retained within the cup shaped housing 52 by a snap ring 56 against which the outer lens 51 is designed to seat. The lens housing 52 and the contained lenses are supported upon a bracket 57 which has a sleeve portion 58 which embraces the cup shaped housing 52, the bracket 57 having a lug 59 secured as by a rivet or other securing element 59' to the vertical leg 32 of the main bracket frame 31.

The objective tube assembly 60, shown more particularly in Figs. 8 and 9, comprises an outer cylindrical tube 61 which can be made of metal, and which contains a pair of spaced objective lenses 62. The lenses 62 are retained in spaced relation by an inner tube 63 snugly fitting within the outer tube 61, the tube 63 being preferably made of treated fiber. Snap rings 64, seating within suitable depressions 65 formed in the outer tube 61, serve to removably retain the adjacent lenses 62 in tube mounted position. The objective tube assembly 60 is positioned exterior of the cover casing 34 and may be supported as shown in Fig. 9 from the vertical leg 32 of the frame bracket 31 by a suitable spring clamp which comprises a pair of resilient and semi-circular shaped half sections 66 extending from associated legs 67 secured as by suitable securing elements 68 to the vertical frame leg 32. The clamp sections 66 serve to resiliently embrace the outer tube 61 of the objective tube assembly 60 in a manner to support the objective lenses 62 in proper alignment with the light bulb 41 and the lenses 51 of the condensing lens assembly 50. An opening or aperture 39 is cut in the adjacent wall of the cover casing 34 through which light rays may pass from the lamp bulb 41 to the objective tube 60.

The film guide assembly 70 is mounted within the cover casing 34, and is located between and in alignment with the lenses 51 of the condensing lens assembly 50 and the lenses 62 of the objective tube assembly 60. The film guide assembly 70, as shown more particularly in Figs. 6 and 8, comprises an inner film guide 71 riveted or otherwise secured to an L-shaped bracket 72 fixed as by suitable securing means 73 to the vertical bracket frame leg 32. The film guide member 71 may be semi-oval in shape and provided with rounded end portions 74, the guide member 71 presenting film guiding flanges 75 along the side edges thereof. The film guide member 71 also presents a depressed center section 76 having an aperture 77 therein through which light rays from the lamp 41 may emerge. The bracket 72 is likewise provided with a light ray opening 78 in alignment with the light ray opening 77. The depressed center section 76 of the guide member 71 is so formed that only the side edges $a'$ of the film strip $a$ bear against the guide member 71 along the raised shoulder portions 79 thereof, thus obviating the possibility of scratching or marring the center portion of the film which carries the pictures or views to be displayed.

The picture film $a$ is additionally supported upon an upper guide roller 80 and a lower guide roller 81. The guide rollers 80 and 81 may be similarly formed from a pair of cup shaped members 82 and 83 whose bottom walls 84 are in face-to-face contact and secured together. The tubular walls 85 of the paired cup members 82 and 83 are inclined toward the bottom walls 84 thereof so that the picture portions of the film $a$ are actually out of contact with the supporting rollers. Each of the supporting rollers 80 and 81 are provided with flared edge portions 86 to retain the film in position thereon.

Figure 11:
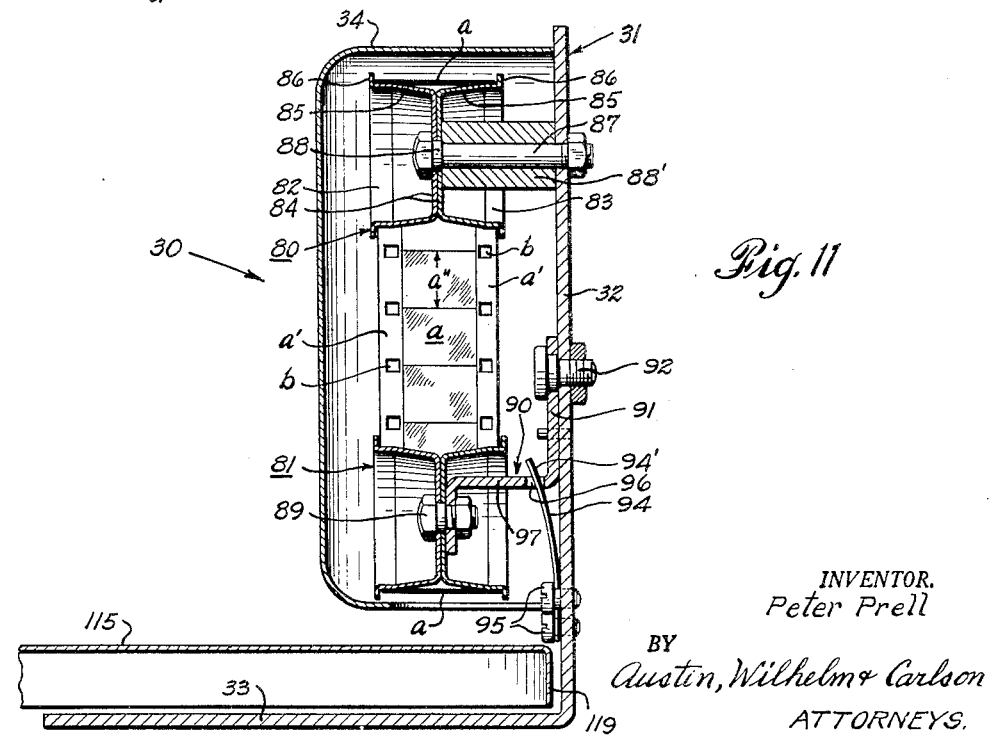
Fig. 11 is another transverse cross-sectional view of the projector instrument as the same would appear when viewed along line 11—11 of Fig. 6.

The upper guide roller 80, as shown more particularly in Fig. 11, is mounted upon a stud bolt 87 secured to the vertically extending leg 32 of the main frame bracket 31. Guide roller 80 is designed to smoothly roll on the stud bolt 87, a shoulder portion 88 being formed on stud bolt 87 in a manner to provide a light frictional resistance to the free rotation of the roller 80. A spacing member 88' mounted on stud 87 between roller wall 84 and vertical leg 32 insures proper positioning of roller 80 and in conjunction with shoulder portion 88 maintains rigid alignment.

The lower guide roller 81, as shown in Figs. 6 and 8, is rotatably secured as by bolt 89 to a pivotally mounted Z-shaped bracket 90 designed to swing on a stud screw 92 extending through leg portion 91 of Z-bracket 90 and secured to the vertical leg 32 on the main frame bracket 31. A steel rod spring 94 has the lower end thereof secured to the vertical leg 32 of the main frame bracket 31 as by a pair of set screws 95. The upper end 94' of the rod spring 94 extends through an aperture 96 in the arm portion 97 of the guide roller supporting bracket 90. The rod spring 94 is mounted and adjusted to exert an outward swinging pressure on the pivotally mounted guide roller supporting bracket 90, as shown more particularly in Fig. 6, so as to maintain a predetermined operating tension on the picture film $a$ when mounted on the guide rollers 80 and 81 and the film guide assembly 70. It will be appreciated that the guide roller 81 may be readily pushed inwardly of the cover casing 34 to relieve the tension on the picture film $a$ to facilitate removal and replacement thereof.

The film actuating assembly 100, as shown more particularly in Figs. 6 and 10, is designed to intermittently advance the film $a$ the distance of one frame $a''$ thereof, so that only one frame at a time is disposed in alignment with the optical system for a predetermined interval. The film advancing mechanism may comprise a lever 101 pivotally mounted on a stud 102 fixed to the vertical leg 32 of the main frame bracket 31. The lever 101 has an inwardly extending arm portion 103 to which a U-shaped bracket 104 is secured as by suitable securing elements 105. A pin 106 extends through the legs of the U-bracket 104, and has a pair of weighted dogs 107 pivotally mounted thereon. Each dog 107 is counterbalanced by the provision of an enlarged and weighted end portion 108 which serves to cause the film engaging point 109 at the other end of the dog to swing upwardly into engagement with the film strip a. The dog points 109 are of such shape and contour as to readily extend into the spaced apertures b extending in spaced relation along each side edge a' of the film strip. A spacing collar 110 mounted on the pin 106 maintains the paired film advancing dogs 107 in spaced alignment and in position for engagement with the spaced film apertures b.

The lever 101 is normally maintained in retracted position by a coil spring 111 secured at one end thereof to the lever 101, the other end of the spring 111 being secured to a stud 112 extending inwardly from the vertical leg 32 of the main frame bracket 31. When the lever 101 is thus maintained in retracted position by the coil spring 111, the film engaging dogs 107 present the points 109 thereof in gripping engagement with the apertures b of the film strip a. The range of swinging movement of the lever 101 is such that when the lever 101 is swung on pivot stud 102 from its retracted position to advance position, the film strip a will be advanced a distance equal to the film length of one of the picture frames a'' of the film strip.

The film advancing lever 101 is swung to advance position at predetermined intervals by driving mechanism which may comprise a turntable 115 which has a stud 116 bolted to the upper horizontal face thereof, the stud 116 presenting a cam face 116'. The lower end of the actuating lever 101 presents an inwardly extending leg 113 which carries an adjustably mounted screw 114 which presents a rounded camming end 114'. Stud screw 114 may be adjusted so that the rounded end portion 114' thereof will be engaged by the cam face 116' of the turntable stud 116 when the turntable 115 is rotated. The direction of rotation of the turntable 115 is such as to periodically move its stud into engagement with the end of screw stud 114 associated with the film actuating lever 101 in a manner to swing the lower end of the camming lever to the left, as shown in Fig. 6, a predetermined distance before release, said predetermined distance being such as to swing the film engaging points 109 of the actuating dogs 107 a distance equal to the length of a full film frame a''. When the lower end of the actuating lever 101 is released by the continuing rotation of the turntable 115, the coil spring 111 will operate to return the actuating lever 101 to its normally non-actuating position.

The turntable 115 may comprise a flanged disc having a hub portion 117 as shown more particularly in Fig. 10. A pivot stud 118 projecting through the hub portion 117 provides a means for rotatably securing the turntable to the horizontal leg 33 of the main frame bracket 31.

Turntable 115 is rotated by a low voltage driving motor 120 as shown more particularly in Figs. 2 and 3. Driving motor 120 has a suitable speed reducing unit 121 associated therewith, which presents a reduced speed shaft 122 to which a small friction roller 123 is fixedly secured. The small driving roller 123 is arranged to have driving engagement with the exterior face of the downturned flange 119 of the turntable 115. To eliminate disturbing vibration caused by the operation of the motor, the motor 120 is mounted on a resilient platform 124, as shown more particularly in Fig. 2, one end of which is secured as by suitable securing means 124' to the bottom wall 21 of the tray carrier 20.

The speed reducing unit 121 of the motor is so made, and the diameter of the driving roller 122 and the diameter of the turntable 115 are so proportioned, as to rotate the turntable 115 through a complete revolution in from six to ten seconds, or such suitable time interval as is desirably required to place each successive film frame a'' in residence at the film guide assembly 70 for a satisfactory viewing period.

*Electric power supply mechanism*

The electric power supply mechanism incorporates a step-down transformer 125, the high voltage side 126 thereof being supplied by commercial current of normal voltage through two conductor lead wire 127 which has an on-and-off switch 128 therein mounted on one of the side walls 17 of the outer casing as shown in Fig. 3. The switch 128 has a suitable push button or lever control element 129 by means of which the current to the electrically operated instruments and mechanisms indication may be controlled. A current supply cord 130 extends from the switch 128 through an insulating bushing 131 fixed in the adjacent side wall 17 of the casing, the electric cord 130 being of sufficient length to permit the plug-in element 132 at the end thereof to be conveniently plugged into a socket fixture.

The transformer 125 may be mounted upon the bottom wall 16 of the casing and secured thereto by suitable securing elements 133 in the form of the invention as illustrated in Figs. 2 and 3. In the form of the invention as illustrated in Figs. 12 and 13, the transformer 125 may be attachably mounted on the bottom wall 21 of the tray carrier 20. The transformer 125 is so constructed as to provide a low voltage side 134 which delivers current at low voltage, such as four to ten volts, to the output lead wire 134'.

The output lead wire 134' is connected to a fixed plug-in assembly 135 which comprises a suitable plug-in receptacle 136 fixedly mounted upon a bracket 137. In the form of the invention as shown in Figs. 2 and 3, the bracket 137 is secured as by securing elements 138 to the bottom wall 16 of the outer casing 15.

An electric contact assembly 140 is mounted on the rear wall 22 of the tray carrier 20 so as to move therewith. The contact assembly 140 comprises a suitable plug 141 carrying contact elements 142 adapted to be detachably inserted into the electrical receptacle 136. The plug-in contact assembly 140 is so mounted on the rear wall 22 of the tray carrier 20 as to insure accurate electric contact between its plug 141 and the electrical receptacle 136, when the tray carrier 20 is fully inserted within the outer casing 15. A low voltage lead cord 144 extends from the plug-in element 141 to the driving motor 120, as indicated in the wiring diagram as shown in Fig. 5. The low voltage power cord 144 is also interconnected in the circuit supplying current to light bulb socket 42 as shown more particularly in Figs. 5, 6 and 10.

The light wires 48 and 49 are connected to the low voltage power cord 144 through a contact switch 145 by means of which the current supply to the light assembly is controlled, the contact switch 145 serving to cut off the current supply to the lamp assembly 40 during the advancing movement of the film strip a, thereby avoiding light flicker during change of pictures on the viewing screen 170.

The switch assembly 145 is automatically operated by an ear 146 which projects laterally from the film actuating lever 101. In normal non-actuating position of the lever 101, the ear 146 is in contact with a pin 147 which extends through an enlarged hole in the inwardly projecting leg 149 of a bracket 148 as shown in Figs. 6 and 7. The other leg 149' of the bracket 148 is secured as by suitable securing elements 148' to the vertical leg 32 of the main frame bracket 31. The pin 147 is designed to slide in a conforming opening provided in an insulating blank 150 which is secured to the leg 149 of the bracket 148. Low voltage power supply wire 144 which leads from the transformer 125 has one of its conductors 144' attached to a resilient metal contact element 151, the contact element 151 being suitably secured to the insulation blank 150 as by a rivet 152. The resilient contact element 151 has a resilient metal portion 151' which overlies the head of the pin 147. A companion contact element 153 is also secured to the insulation blank 150 as by rivet 154, the companion contact element 153 being connected to wire 48 which leads to the lamp assembly 40. Resilient contact element 153 has a contact portion 153' which overlies the resilient contact portion 151' of contact element 151.

When the film actuating lever 101 is in its normal non-actuating position, the ear portion 146 thereof will maintain the head of the pin 147 pressed against the contact element 151, so as to maintain the resilient contact portion 151' thereof in resilient contact with the contact portion 153' of the companion contact element 153 so as to permit current flow from lead wire 144' into the lamp lead wire 48 in accordance with the circuit shown in Fig. 5. When the film actuating lever 101 is actuated by the turntable 115, the ear portion 146 of the actuating lever 101 will be moved out of engagement with the pin 147, so that electric contact between contact portions 151' and 153' is broken during the instant the lever 101 is operating to advance the film strip a, and prior to its return to its normal non-actuating position by the coil spring 111. Simple and positive means are thus provided to break the current flow to the lamp assembly 40 during the instant that the film strip is being advanced, thereby avoiding light flicker on the viewing screen 170 during the instant of picture change thereon.

Reflecting mirror assembly

As shown more particularly in Figs. 2 and 3, a reflecting mirror assembly 160 is provided to change the direction of the picture rays emanating from the projector instrument 30 in a manner to translate these rays as a clear and enlarged image picture on the viewing screen 170. The reflecting assembly 160 comprises a suitable reflecting mirror 161 which is mounted on a backing plate 162 having clamping tongues 163 associated therewith to retain the mirror 161 securely mounted thereon.

The mirror 161 and its supporting plate 162 is preferably adjustably mounted so as to accurately pick up the light rays from the projector instrument 30 and accurately transmit these rays in properly centered position upon the viewing screen 170. The adjustable mounting for the mirror 160 may comprise a U-bracket presenting spaced upright leg portions 164 and a connecting base portion 165, the base portion 165 thereof being secured to the bottom wall 16 of the casing by means of a pivot stud 166 having a wing clamp nut 166'. The upper ends of the spaced legs 164 support a horizontal rod 167 which extends through a pair of spaced pivot lugs 168 fixed to the mirror supporting plate 162. One pivot lug 168 may be provided with a set screw 169 by means of which it may be adjustably clamped to the supporting rod 167.

By a suitable adjustment of the set screws 169, it will be appreciated that the mirror 161 may be maintained in any desired tilted position on the supporting rod 167. Likewise the mirror 161 may be laterally swung to any desired reflecting position by swinging the base portion 165 of the U-shaped supporting bracket in the appropriate manner and securing the bracket in the selected adjusted position by the wing nut 166'. Ready access to the reflecting mirror assembly to effect adjustment thereof may be had by removing the rear wall 19 of the casing 15.

Any desired number of adjustably mounted mirrors 161 may be associated with this machine to reflect the light rays from the projector instrument 30 in a manner to not only enlarge the picture as projected on the viewing screen 170, but also to permit the mounting of the viewing screen 170 on any selected wall of the outer casing 15. It will be also appreciated that by providing one or more reflecting mirrors 161, the overall size of the outer casing 15 may be reduced to almost any desired size, and yet provide picture projection on the viewing screen 170 of clearly viewable proportions. It will accordingly be appreciated that this invention contemplates the provision of any desired number of reflecting mirror assemblies to obtain clearly viewable pictures in comfortable viewing sizes, produced by instruments and mechanisms contained in an outer casing of limited size and which may be made readily portable.

Viewing screen assembly

The viewing screen assembly comprises essentially a transparent viewing screen 170 of the type well known in the art for receiving and making visible film pictures projected thereon. The transparent viewing screen 170 is preferably mounted in one of the outer walls of the casing 15 in a position to be clearly and comfortably viewed. The viewing screen 170 should be positioned to permit unobstructed projection of a cone of light thereon from the reflecting mirror 161. The outer casing 15 is shaped and designed to effect this result.

In the form of the invention illustrated in Figs. 1 and 2, the transparent viewing screen 170 is shown as mounted directly above the front wall 23 of the tray carrier 20. The viewing screen 170 is preferably rectangular in form and may be provided with suitable flanges 171 secured to a suitable rectangular frame 172 associated with the outer casing. The casing frame 172 may be arranged to support the viewing screen 170 in a comfortable viewing inclined position. The top wall 18 of the casing may be appropriately inclined to permit unobstructed projection of the light rays from the reflecting mirror 161 onto the viewing screen 170.

It will be appreciated that the viewing screen 170 may well be arranged within the purview of this invention at one side of the movable tray carrier 20, or below the movable tray carrier 20. It will also be appreciated that by the provision of a suitable arrangement of reflecting mirrors 161, the viewing screen 170 may be positioned at one end of the casing 15 with the movable carrier 20 positioned at the other end of the casing. By various and sundry placing arrangements of the instruments and mechanisms within the casing 15, the contour and shape of the outer casing may be varied and modified as desired, and the viewing screen 170 may also be located on almost any selected wall of the outer casing.

Sound producing mechanism

This invention also contemplates the provision of sound recording mechanism whereby music, talk or other sound commentary may be synchronized with the picture display. The sound reproducing mechanism 175 as illustrated in Figs. 12 and 13 may comprise a record player mounted upon the movable carrier 20 along with the projector instrument 30. As here illustrated, the record player comprises a turntable 176 rotated by a suitable electric motor 177 contained within the sound reproducing casing 178. The sound instrument as shown in Figs. 12 and 13 also embodies a playing head 179 associated with a mechanical type of tone arm 180. The turntable 176 is designed to support a suitable sound record $d$, the sound produced escaping through suitable apertures or grille work 181 in the sound instrument casing 178. It is understood that a record player of the type shown in Figs. 12 and 13 represents only one type of sound reproducing mechanism which may be employed, and that a record player of the type having an electronic pick-up, and incorporating an electronic amplifier arrangement, can be used with equal facility.

The driven shaft 183 of the sound instrument motor 177 may be provided with a small pulley wheel 184 by means of which the film actuating turntable 115 may be rotated. In the construction shown in Figs. 12 and 13, the pivot stud 118 of the film advancing turntable 115 is provided with a pulley wheel 185 around which the driving belt 186 is trained, the driving belt 186 also being trained around the motor pulley wheel 184. By this driving arrangement, the same motor 177 may be employed to operate the turntable 176 of the sound reproducer, as well as the film actuating turntable 115.

In the embodiment shown in Figs. 12 and 13, the tray carrier 20 is designed to slide through an opening in one of the side walls 17 of the outer casing, the side wall 17 having suitable framing 188 providing a trim seat for the front panel 23 of the tray carrier 20. The casing frame 29 at the front of the outer casing supports grille work 189 through which sound produced by the sound reproducing mechanism escapes adjacent the viewing screen 170. The rear wall 22 of the sliding tray carrier 20, as shown in Fig. 13, supports the contact assembly 140 as heretofore described which cooperates with a companion contact assembly 135 which may be supported upon the adjacent side wall 17 of the outer casing. In this arrangement the off-and-on switch 128 is also supported on the side wall 17 of the outer casing and connected to the contact assembly 135 by power cord 190 of normal commercial voltage. The electrical contact assembly 140 supported on the rear wall 22 of the tray carrier is connected to the driving motor 177 of the sound recording instrument by a power cord 191 of normal commercial voltage.

Another power cord 192 extends from the contact assembly 140 to the high voltage input side 126 of a transformer 125 which is supported upon the bottom wall 21 of the tray carrier 20. The low voltage output side 134 of the transformer is connected by lead wire 193 to the contact switch 145, in turn connected to the low voltage current wire 48 connected to the light assembly 40 of the projector instrument 30. In this arrangement, the projector instrument 30 is mounted on the rear wall 22 of the tray carrier 20 by the main frame bracket 31 in a manner to project the light rays in an unobstructed manner onto the reflecting mirror 161.

In the arrangement shown in Figs. 12 and 13, withdrawal of the tray carrier 20 breaks the electric current supply at cooperating contact assemblies 135 and 140 to automatically halt the operation of the machine in event the current supply to the instruments supported on the tray 20 has not previously been cut off by the use of the control switch 128. Upon withdrawal of the tray carrier 20, the record disc $d$ or other sound strip may be changed, and the picture strip may also be removed and changed by removing the cover housing 34 of the projector instrument 30. The record disc $d$ may carry a suitable sound track operating in timed relation to the film pictures to be displayed on the picture screen 170. The record turntable 176 may be provided with speed adjustment so that the turntable may be rotated at a speed to accurately coordinate its sound track with the displayed film pictures.

Operation of the machine

This improved picture projecting machine may be designed to reproduce pictures from a travelling film upon the viewing screen 170, either in the form of successive still pictures, or as moving pictures. Where moving pictures are to be displayed, the film supporting rollers 80 and 81 may be constructed in the form of a film pay-out reel and a film take-up reel. In the case of moving pictures, the high speed advance of the film may be effected by increasing the relative speed of the actuating turntable 115, and/or by mounting a plurality of actuating studs 116 thereon.

In operating the machine, the tray carrier 20 is withdrawn from the outer casing, the housing cover 34 of the projector instrument 30 removed, and the selected film can then be easily mounted without obstruction on the guide rollers 80 and 81 and around the film guide assembly 70. The sound record, such as the sound record disc $d$, is then mounted on the sound reproducing instrument, and the playing head 179 placed in proper starting position. The tray carrier 20 is then inserted into the outer casing and electrical connection between the contact assemblies 140 and 135 is thus automatically effected. The control switch 128 is then operated, which automatically throws the projector instrument 30 and the sound recording mechanism 175 into operation. The control switch 128 is readily accessible on the outside wall of the outer casing so that the operation of the machine can be started and shut off any time as desired. By the provision of the automatically detachable contact assemblies 135 and 140, the current supply is automatically broken in event the unskilled operator should attempt to change the sound record or the film without having first shut off the current supply by switch 129.

While adjustment of the mirror assembly 160 would normally be made at the factory before the machine is shipped, any desired realignment or adjustment of the mirror 161 may be accessibly made by merely removing the adjacent rear wall 19 of the outer casing. All mechanisms and instruments not mounted on the tray carrier 20 and readily accessible upon withdrawal of the tray carrier from the outer casing, are mounted within the casing in a manner to be clearly accessible upon removal of the rear wall 19 thereof.

This machine is particularly designed for low cost mass production to provide a highly serviceable and substantially fool-proof machine adapted to be operated by unskilled operators. The machine embodies simplicity in design, and can be largely assembled from stamped parts. All the instruments and mechanisms necessary for the reproduction of clearly viewable pictures are contained within a compact casing which can be made in small size, weighing a relatively few pounds, and thus made readily portable.

This improved picture projection machine finds particular appeal as an instructive and entertaining amusement device for children as well as grown-ups. Films presenting fairy tale pictures, historical pictures, and instructive pictures of various sorts, in small 16 millimeter size, to be shown either as still pictures or as moving pictures, may be adaptably projected in machines constructed in accordance with this invention. Sound reproducing mechanism operating to provide synchronized and accompanying talk or music, produced from a sound record or magnetic or electronic sound track, may be incorporated in the machine at small additional cost.

In addition to its entertaining and instructive values, this improved low-cost machine finds extensive application as a mechanical salesman, whereby manufacturers of various products may entertainingly describe and picturize their products or manufacturing procedures. Machines constructed in accordance with this invention may be used in commercial selling establishments, not only to entertain and instruct prospective customers awaiting clerical attention, but may be used to save the time and relieve the clerk of constant tiring repetition of the merits of the particular product sold by the clerk.

While certain novel features of the invention have been disclosed herein, and are pointed out in the annexed claims, it will be understood that various omissions, substitutions, and changes may be made by those skilled in the art without departing from the spirit of the invention.

What is claimed is:

1. A picture projecting machine including in combination, an enclosed casing, a translucent viewing screen mounted in an opening in said casing, a projector mounted in said casing, said projector including a light and lens system and means for periodically advancing a picture strip in projecting relation to said light and lens system, and a reflector mounted in said casing operative to direct the projected views onto said screen, said film strip advancing means including a pivotally mounted lever, means associated with one end of said lever operative to detachably engage said film strip, a rotatable member mounted adjacent the opposite end of said lever, means for rotating said member, and means associated with said rotatable member and the adjacent end of said lever to periodically oscillate said lever and advance said film strip during rotation of said member.

2. A picture projecting machine including in combination, an enclosed casing, a viewing screen associated with said casing, a support movable into and out of said casing, a picture projector including a light and lens system, a supporting carrier for a picture strip, and means for moving the supported picture strip in projecting relation to said light and lens system, said picture projector being mounted on said movable support in a manner to permit withdrawal of said projector from said casing to facilitate mounting of the picture strip on said supporting carrier, and a circuit supplying current to said projector, said circuit having an electric contact element fixedly mounted in said casing, and a companion electric contact element mounted on said movable support, said contact elements being arranged for contact engagement upon insertion of said support into said casing and for contact disengagement upon withdrawal of said support from said casing.

3. A picture projecting machine including in combination, an enclosed casing, a viewing screen mounted in an opening in said casing, a projector mounted in said casing, said projector including an electric lamp and lens system and a device for periodically advancing a film strip in projecting relation to said lamp and lens system, a step-down transformer mounted in said casing, a switch for said lamp, a circuit connection between the low voltage side of said step-down transformer and said electric lamp and lamp switch for delivering low voltage current to said lamp, and means operable by said strip advancing device to effect opening of said lamp switch to deenergize said lamp during actuation of said device and to maintain said switch closed when said device is non-actuated.

4. A picture projecting machine including in combination, an enclosed casing, a translucent viewing screen associated with said casing, a mounting movable into and out of said casing, a picture projector supported on said mounting, said projector including a light and lens system and means for moving a picture strip in projecting relation to said light and lens system, a reflector adjustably mounted within said casing operative to direct the projected views from said projector onto said screen when said projector is in housed position within said casing, and a circuit supplying current to said projector, said circuit having an electric contact element fixedly mounted in said casing, and a companion electric contact element mounted on said movable mounting, said contact elements being arranged for contact engagement upon insertion of the mounting into said casing and for contact disengagement upon withdrawal of the mounting from said casing.

5. A picture projecting machine including in combination, an enclosed casing, a viewing screen associated with said casing, a support movable into and out of said casing, and a picture projector including an electric lamp and lens system, a supporting carrier for a picture strip, means for moving the supported picture strip in projecting relation to said light and lens system, said picture projector being mounted on said movable support in a manner to permit withdrawal of said projector from said casing to facilitate mounting of the picture strip on said supporting carrier, a step-down transformer in said casing, and a circuit connection between the low voltage side of said step-down transformer and said electric lamp for delivering low voltage current to said lamp said circuit having a contact element fixedly mounted in said casing, and a companion electric contact element mounted on said movable support, said contact element being arranged for contact engagement upon insertion of said movable support into said casing and for contact disengagement upon withdrawal of said support from said casing.

6. A picture projecting machine including in combination, a casing presenting enclosing panels, a carrier movable into and out of said casing through an opening in one of said panels, a projector mounted on said carrier, said projector including a light and lens system and means for moving a picture strip in projecting relation to said light and lens system, a translucent viewing screen mounted on another of said panels, a reflector operative to direct the projected views from said projector onto said screen, and a circuit supplying current to said projector, said circuit having an electric contact element fixedly mounted in said casing, and a companion electric contact element mounted on said movable carrier, said contact element being arranged for contact engagement upon insertion of the carrier into said casing and for contact disengagement upon withdrawal of the carrier from said casing.

7. A picture projecting machine including in combination, a casing, a carrier movable into and out of said casing, a projector mounted on said carrier, said projector including a light and lens system and means for moving a picture strip in projecting relation to said light and lens system, a motor mounted on said carrier for driving said strip moving means, a translucent viewing screen associated with said casing, a reflector operative to direct the projected views from said projector onto said screen, and a circuit supplying current to said projector, said circuit having an electric contact element fixedly mounted in said casing, and a companion electric contact element mounted on said movable carrier, said contact element being arranged for contact engagement upon insertion of the carrier into said casing and for contact disengagement upon withdrawal of the carrier from said casing.

8. A picture projecting machine including in combination, an enclosed casing, an externally visible translucent viewing screen mounted on a wall of said casing, a carrier movable into and out of said casing, a projector mounted on said carrier, said projector including an electric lamp and lens system and means for moving a picture strip in projecting relation to said lamp and lens system, a reflector mounted in said casing operative to direct the projected views from said projector onto said screen, an electric contact element fixedly mounted in said casing and connected to a power source, and a companion electric contact element mounted on said movable carrier and connected to said electric lamp, said contact elements being arranged for contact engagement upon insertion of the carrier into said casing and for contact disengagement upon withdrawal of the carrier from said casing.

9. A picture projecting machine including in combination, an enclosed casing, a viewing screen associated with said casing, a picture projector mounted in said casing, said projector including a light and lens system and means for advancing the picture strip in projecting relation to said light and lens system, a sound reproducing device mounted in said casing, a motor having means for driving said picture strip advancing means and said sound reproducing device in synchronism, a step-down transformer, a circuit connection between the low voltage side of said transformer and said projector, a switch in said circuit for controlling said light source, means operable by said picture strip advancing means to effect opening of said switch to deenergize said light source during actuation of said strip advancing means and to maintain said switch closed when said strip advancing means is non-actuated, and a reflector mounted in said casing operative to direct the projected views onto said screen.

10. A picture projecting machine including in combination, an enclosed casing, a carrier movable into and out of said casing, a projector mounted on said carrier, a sound reproducing device mounted on said carrier, a motor mounted on said carrier and associated with said projector and said sound producing device for driving same in synchronism, a translucent viewing screen mounted on a wall of said casing, a step-down transformer mounted on said carrier, and a circuit connection between the low voltage side of said transformer and said projector, and a reflector in said casing operative to direct the projected views from said projector onto said screen.

11. A picture projecting machine including in combination, an enclosed casing, a carrier movable into and out of said casing, a projector mounted on said carrier, a sound reproducing device mounted on said carrier, a motor mounted on said carrier and associated with said projector and said sound reproducing device for driving same in synchronism, a step-down transformer mounted on said carrier, a circuit connection between the low voltage side of said transformer and said projector, a translucent viewing screen mounted on a wall of said casing, and a reflector in said casing operative to direct the projected views from said projector onto said screen.

12. A picture projecting machine including in combination, an enclosed casing, a carrier movable into and out of said casing, a projector mounted on said carrier, said projector including an electric lamp and lens system and means for moving a picture strip in projecting relation to said light and lens system, a sound reproducing device mounted on said carrier, means for driving said picture strip advancing means and said sound reproducing device in synchronism, an electric contact element fixedly positioned in said casing, and a companion contact element mounted on said movable carrier, said contact elements being arranged for contact engagement upon insertion of the carrier into said casing and arranged to be disengaged upon withdrawal of the carrier from said casing.

13. A picture projecting machine including in combination, an enclosed casing, a carrier movable into and out of said casing, a projector mounted on said carrier, said projector including an electric lamp and lens system and means for moving a picture strip in projecting relation to said light and lens system, a sound reproducing device mounted on said carrier, means for driving said picture strip advancing means and said sound reproducing device in synchronism, an electric contact element fixedly positioned in said casing, a companion contact element mounted on said movable carrier, said contact elements being arranged for contact engagement upon insertion of the carrier into said casing and arranged to be disengaged upon withdrawal of the carrier from said casing, a translucent viewing screen mounted on said casing, and a reflector operative to direct the projected views from said projector onto said screen.

PETER PRELL.

REFERENCES CITED

The following references are of record in the file of this patent:

UNITED STATES PATENTS

| Number | Name | Date |
|---|---|---|
| 1,460,590 | Kucharski | July 3, 1923 |
| 1,468,547 | Rummel | Sept. 18, 1923 |
| 1,674,946 | Brixey | June 26, 1928 |
| 1,967,161 | Simon | July 17, 1934 |
| 2,180,638 | McMahon et al. | Nov. 21, 1939 |
| 2,231,395 | Schlegel | Feb. 11, 1941 |
| 2,265,992 | Beck | Dec. 16, 1941 |
| 2,290,287 | Links et al. | July 21, 1942 |
| 2,312,294 | Worthington et al. | Feb. 23, 1943 |
| 2,322,023 | Hopkins | June 15, 1943 |
| 2,342,874 | Links et al. | Feb. 29, 1944 |
| 2,361,398 | Harris et al. | Oct. 31, 1944 |
| 2,401,434 | Mills | June 4, 1946 |